(12) United States Patent
Shin et al.

(10) Patent No.: US 10,936,564 B2
(45) Date of Patent: Mar. 2, 2021

(54) DIAGNOSTIC METHOD AND SYSTEM UTILIZING HISTORICAL EVENT LOGGING DATA

(71) Applicant: Xerox Corporation, Norwalk, CT (US)

(72) Inventors: Helen Haekyung Shin, Fairport, NY (US); Matthew John Quirk, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 951 days.

(21) Appl. No.: 15/491,302

(22) Filed: Apr. 19, 2017

(65) Prior Publication Data

US 2018/0307713 A1 Oct. 25, 2018

(51) Int. Cl.
| | |
|---|---|
| G06Q 50/00 | (2012.01) |
| G06Q 50/22 | (2018.01) |
| G16H 50/30 | (2018.01) |
| G06F 16/21 | (2019.01) |
| G06N 7/00 | (2006.01) |
| G06N 5/00 | (2006.01) |
| G06N 20/00 | (2019.01) |

(52) U.S. Cl.
CPC ......... *G06F 16/219* (2019.01); *G06N 5/003* (2013.01); *G06N 7/005* (2013.01); *G06N 20/00* (2019.01)

(58) Field of Classification Search
CPC ...... G06F 16/219; G06N 20/00; G06N 5/003; G06N 7/005
USPC ................................ 706/1–62; 1/1
See application file for complete search history.

(56) References Cited

U.S. PATENT DOCUMENTS

| | | | |
|---|---|---|---|
| 6,850,252 B1* | 2/2005 | Hoffberg | G06K 9/00369 |
| | | | 348/E7.061 |
| 8,145,073 B2 | 3/2012 | Bouchard et al. | |
| 8,264,702 B2 | 9/2012 | St. Jacques, Jr. et al. | |
| 8,650,187 B2 | 2/2014 | Chen et al. | |
| 8,902,450 B2 | 12/2014 | Scrafford et al. | |
| 8,965,949 B2 | 2/2015 | Thieret | |
| 2008/0246987 A1 | 10/2008 | Scrafford et al. | |
| 2010/0324936 A1* | 12/2010 | Vishnubhatla | G06Q 50/24 |
| | | | 705/3 |
| 2013/0014136 A1* | 1/2013 | Bhatia | H04N 21/4222 |
| | | | 725/9 |
| 2014/0006013 A1* | 1/2014 | Markatou | G06F 40/40 |
| | | | 704/9 |
| 2016/0007083 A1* | 1/2016 | Gurha | H04N 21/252 |
| | | | 725/13 |
| 2016/0012182 A1* | 1/2016 | Golay | G16H 40/20 |
| | | | 705/3 |
| 2017/0262614 A1* | 9/2017 | Vishnubhatla | G06Q 50/22 |
| 2018/0032678 A1* | 2/2018 | Dandala | G16H 50/30 |

OTHER PUBLICATIONS

Boehm et al., "Software Defect Reduction Top 10 List", Software Management, Jan. 2001, pp. 135-137.

* cited by examiner

*Primary Examiner* — Brandon S Cole
(74) *Attorney, Agent, or Firm* — Fay Sharpe LLP

(57) ABSTRACT

Disclosed is a diagnostic method and system including the processing of historical event logs generated by one or more devices. According to an exemplary embodiment, a diagnostic system includes an event log acquisition module, an event classification module classifying event logs acquired, and a diagnostic module generating a labeled version of the historical event log including labels provided by the classification module. The event classification module is trained using supervised machine learning techniques.

15 Claims, 21 Drawing Sheets

```
<soapenv.Envelopexmlns:soap env="http://schemas.xmlsoap.org/soap/envelope/"
xmlns:log="http//www.xerox.com/webservices/office/2016/02/25/LogEntryInput"
xmlns:log1="http//www.xerox.com/webservices/office/2016/02/29/LogEntryInputMetadata">
   <soapenv:Header/>
   <soapenv:Body>
      <log:LogMultipleEntryRequest>
         <!--1 or more repetitions:-->
         <log:LogSingleEntry>
            <log:LogRequiredFields>
               <log:LogName>?</log:LogName>
               <log:ApplicationName>?</log:ApplicationName>
               <log:Severity>?</log:Severity>
               <log:DateTimeStamp>?</log:DateTimeStamp>
               <log:MessageText>?</log:MessageText>
               <!-Optional:->
               <log:MessageTextRegEx>?</log:MessageTextRegEx>
            </log:LogRequiredFields>
            <!-Optional:->
            </log:LogOptionalFields>
               <!-Optional:->
               <log:Type>?</log:Type>
               <!-Optional:->
               <log:Category>?</log:Category>
               <!-Optional:->
               <log:Method>?</log:Method>
            </log:LogOptionalFields>
         </log:LogSingleEntry>
         <log:MultiFunctionDeviceSignature>
```

FIG. 7

```
<log:MacAddress>?</log:MacAddress>
<!--Optional:-->
<log:SerialNumber>?</log:SerialNumber>
<!--Optional:-->
<log:ModelName>?</log:ModelName>
<!--Optional:-->
<log:IpAddress>?</log:IpAddress>
</log:MultiFunctionDeviceSignature>
<!--Zero or more repetitions:-->
<log:LogTextFieldFilter>
   <!--Optional:-->
   <log1:LogField>?</log1:LogField>
   <!--Optional:-->
   <log1:Operator>?</log1:Operator>
   <!--Optional:-->
   <log1:Value>?</log1:Value>
</log:LogTextFieldFilter>
<!--Zero or more repetitions:-->
<log:LogDateTimeFieldFilter>
   <!--Optional:-->
   <log1:LogField>?</log1:LogField>
   <!--Optional:-->
   <log1:Operator>?</log1:Operator>
   <!--Optional:-->
   <log1:Value1>?</log1:Value1>
   <!--Optional:-->
   <log1:Value2>?</log1:Value2>
</log:LogDateTimeFieldFilter>
</log:LogMultipleEntryRequest>
</soapenv:Body>
</soapenv:Envelope>
```

FIG. 7 CONTINUED

| LABEL | printerID | subUnitID | severityLevel | trainingLevel | DESCRIPTION |
|---|---|---|---|---|---|
| ERROR | 1182 | 10 | 5 | 4 | DRUM LIFE LOW REPLACE KIT |
| ERROR | 1182 | 10 | 3 | 5 | 50.7 FUSER ERROR |
| ERROR | 1182 | 5 | 3 | 3 | OFFLINE |
| NOERROR | 1182 | 5 | 1 | 3 | POWERSAVE ON |
| NOERROR | 1182 | 5 | 1 | 1 | CANCELING JOB |
| ERROR | 1382 | 11 | 3 | 3 | INK EMPTY BLACK |
| ERROR | 1382 | 5 | 3 | 3 | OFFLINE |
| ERROR | 1188 | 8 | 3 | 3 | THE MACHINE IS COMPLETELY OUT OF PAPER. USER INTERVENTION REQUIRED TO ADD PAPER TO ONE OR MORE TRAYS. PRINTING HAS STOPPED. ALL OTHER MACHINE SERVICES (IF INSTALLED) ARE UNAFFECTED. |
| ERROR | 1188 | 11 | 3 | 6 | C1-1140 THE TONER CARTRIDGE IS EMPTY. IMMEDIATE USER INTERVENTION IS REQUIRED TO REPLACE THE CARTRIDGE. PRINTING HAS STOPPED. ALL OTHER MACHINE SERVICES (IF INSTALLED) ARE UNAFFECTED. |
| ERROR | 1188 | 8 | 4 | 3 | M1-5112 TRAY 1 IS EMPTY. USER INTERVENTION REQUIRED TO ADD PAPER TO TRAY 1. PRINTING CAN CONTINUE IF THE REQUIRED MEDIA IS AVAILABLE FROM OTHER TRAYS. ALL OTHER MACHINE SERVICES (IF INSTALLED) ARE UNAFFECTED. |

FIG. 8

| | | | | |
|---|---|---|---|---|
| ERROR | 1188 | 8 | 4 | 3 | M1-5612 TRAY MP IS EMPTY. USER INTERVENTION REQUIRED TO ADD PAPER TO TRAY MP. PRINTING CAN CONTINUE IF THE REQUIRED MEDIA IS AVAILABLE FROM OTHER TRAYS, ALL OTHER MACHINE SERVICES (IF INSTALLED) ARE UNAFFECTED. |
| ERROR | 1189 | 8 | 3 | 3 | 07-110 TRAY 1 IS EMPTY. USER INTERVENTION REQUIRED TO ADD PAPER TO TRAY 1. PRINTING CAN CONTINUE IF THE REQUIRED MEDIA IS AVAILABLE FROM OTHER TRAYS, ALL OTHER MACHINE SERVICES (IF INSTALLED) ARE UNAFFECTED. |
| ERROR | 1391 | 10 | 5 | 3 | MARKER GROUP, MARKER FUSER UNDER TEMPERATURE CONDITION DETECTED |
| ERROR | 1391 | 9 | 3 | 3 | OUTPUT GROUP, COVER OPEN CONDITION DETECTED |
| ERROR | 1391 | 6 | 3 | 3 | COVER GROUP, COVER OPEN CONDITION DETECTED |
| ERROR | 1391 | 5 | 4 | 6 | GENERAL PRINTER GROUP, POWER UP CONDITION DETECTED |
| ERROR | 1395 | 8 | 3 | 3 | PAPER OUT |
| ERROR | 1203 | 10 | 5 | 3 | MARKER GROUP, MARKER FUSER UNDER TEMPERATURE CONDITION DETECTED |
| ERROR | 1203 | 10 | 5 | 3 | MARKER GROUP, MARKER FUSER UNDER TEMPERATURE CONDITION DETECTED |

FIG. 8
CONTINUED

| | | | | |
|---|---|---|---|---|
| ERROR | 1206 | 11 | 4 | 6 | C2-1110 TIME TO ORDER TONER CARTRIDGE. USER INTERVENTION REQUIRED TO ORDER, BUT NOT REPLACE. THE CARTRIDGE TO AVOID FUTURE INTERRUPTION OF PRINT SERVICE. PRINTING AND ALL OTHER MACHINE SERVICES (IF INSTALLED) ARE UNAFFECTED. |
| ERROR | 1206 | 8 | 3 | 3 | M1-5120 ALL TRAYS ON SYSTEM ARE EMPTY. USER INTERVENTION REQUIRED TO ADD PAPER TO TRAYS. PRINTING HAS STOPPED, ALL OTHER MACHINE SERVICES (IF INSTALLED) ARE UNAFFECTED |
| NOERROR | 1206 | 5 | 1 | 7 | S2-3313 THE MACHINE IS CURRENTLY IN POWER SAVER MODE. NO USER INTERVENTION IS REQUIRED. PRINTING WILL START WHEN A JOB IS RECEIVED FROM THE NETWORK, A FAX JOB HAS BEEN RECEIVED (IF INSTALLED), OR A SCAN/COPY JOB IS INITIATED AT THE LOCAL UI. |
| ERROR | 1416 | 8 | 4 | 3 | TRAY 1 LOW |
| ERROR | 1416 | 11 | 3 | 4 | 88 TONER LOW |
| ERROR | 1221 | 11 | 3 | 4 | REPLACE YELLOW CARTRIDGE |
| NOERROR | 1221 | 5 | 1 | 3 | POWERSAVE ON |

FIG. 8
CONTINUED

| | | | | | |
|---|---|---|---|---|---|
| ERROR | 1221 | 11 | 3 | 4 | CLEAN FUSER INPUT THEN REPLACE BLACK CARTRIDGE |
| ERROR | 1221 | 5 | 3 | 3 | PAUSED |
| ERROR | 1221 | 11 | 3 | 4 | REPLACE SUPPLIES |
| ERROR | 1221 | 11 | 3 | 4 | REPLACE CYAN CARTRIDGE |
| ERROR | 1221 | 11 | 3 | 4 | REPLACE MAGENTA CARTRIDGE |
| ERROR | 1221 | 8 | 5 | 3 | TRAY 2 EMPTY PLAIN LETTER |
| ERROR | 1231 | 11 | 4 | 4 | REPLACE BLACK CARTRIDGE |
| ERROR | 1231 | 11 | 3 | 4 | REPLACE BLACK CARTRIDGE [88.31] |
| ERROR | 1239 | 5 | 3 | 5 | SERVICE CALL REQUIRED |
| ERROR | 1241 | 8 | 5 | 3 | TRAY 2 EMPTY |
| ERROR | 1241 | 11 | 3 | 4 | BLACK CARTRIDGE VERY LOW |
| ERROR | 1254 | 5 | 3 | 5 | SERVICE CALL F023 |
| ERROR | 1327 | 4 | 4 | 7 | POWER SAVER |
| ERROR | 1327 | 8 | 4 | 3 | INPUT TRAY EMPTY |
| ERROR | 1327 | 8 | 4 | 3 | INPUT TRAY EMPTY |
| NOERROR | 1292 | 0 | 0 | 0 | SLEEP |

FIG. 8
CONTINUED

| NOERROR | 1293 | 0 | 0 | 0 | SLEEP |
|---|---|---|---|---|---|
| ERROR | 1303 | 13 | 3 | 4 | CLEANING SHEET NEEDED. LOAD LETTER, A4, OR LEGAL SIZE PAPER. PRINTING IS DISABLED. |
| ERROR | 1303 | 5 | 3 | 5 | 93,982.00:1008, PRINTER ERROR. CONTACT SERVICE AND REPORT THIS FAULT CODE. PRINTING IS DISABLED. |
| ERROR | 1303 | 13 | 3 | 4 | PAPER JAM. REMOVE TRAY 2 TO CLEAR. PRINTING IS DISABLED |
| ERROR | 2490 | 11 | 5 | 4 | BLACK CARTRIDGE VERY LOW |
| NOERROR | 2490 | 5 | 1 | 3 | SLEEP MODE ON |
| ERROR | 1312 | 5 | 3 | 3 | THE PRINTER IS OFFLINE. |

FIG. 8
CONTINUED

Event code: 3005 (1)
Event message: An unhandled exception has occurred. (2)
Event time: 5/19/2016 11:43:53 PM (3)
Event time (UTC): 5/20/2016 3:43:53 AM (4)
Event ID: a055cafa389b4e95ac2d3da67bd0caab (5)
Event sequence: 457 (6)
Event occurrence: 1 (7)
Event detail code: 0 (8)

Application information:
Application domain: /LM/W3SVC/1/ROOT/CWW_Web_Application-1-131081892414241669 (10)
Trust level: Full (11)
Application Virtual Path: /CWW_Web_Application (12)
Application path: C:\XGS-SD\XOS\Device Management\Mainline\XDMC\WW\Mainline\XDMC\WW_Web_Application\ (13)
Machine name: HELENESH-PC (14)

Process information:
Process ID: 6632 (17)
Process name: w3wp.exe (18)
Account name: NT AUTHORITY\NETWORK SERVICE (19)

FIG. 9

Exception information:

Exception type: InvalidOperationException (22)
Exception message: Method CUIRegistrationWebProxy.GetWeblet can not be reflected. (23)
at System.Web.Services.Protocols.SoapReflector.ReflectMethod(LogicalMethodInfo methodInfo, Boolean client, XmlReflectionImporter xmlImporter, SoapReflectionImporter soapImporter, String defaultNs) (25)
at System.Web.Services.Protocol.SoapclientType.GenerateXmlMappings (Type type, ArrayList soapMethodlist, String serviceNamespace, Boolean serviceDefaultIsEncoded, Arraylist mappings) (27)
at System.Web.Services.Protocols.SoapClientType..ctor(Type type) (28)
at System.Web.Services.Protocols.SoapHttpClientProtocol..ctor() (29)
at Microsoft.Web.Services3.WebservicesClientProtocol..ctor() (30)
at Xerox.CWW.Discovery.WebProxyService.CUIRegistrationWebProxy..ctor() in c:\XGS-SDI\XOS\Device ManagementMainline\Common\Discovery\Source\Xrx\Discovery\WebProxy\EIP\CUIRegistrationWebProxy.cs:line 46 (32)

FIG. 9
CONTINUED

| RANK BY INFO GAIN | FEATURE WORD | INFO GAIN |
|---|---|---|
| 0 | JOB | 0.238317294 |
| 1 | START | 0.226587344 |
| 2 | printing_start | 0.226587344 |
| 3 | start_job | 0.226587344 |
| 4 | received | 0.22557374 |
| 5 | job_received | 0.22557374 |
| 6 | fax_job | 0.219861979 |
| 7 | received_installed | 0.219861979 |
| 8 | fax | 0.2137526 |
| 9 | ready | 0.200640273 |
| 10 | required | 0.198985951 |
| 11 | intervention_required | 0.1905446 |
| 12 | received_fax | 0.189812478 |
| 13 | installed_user | 0.189812478 |
| 14 | initiates | 0.189812478 |
| 15 | user_initiates | 0.189812478 |
| 16 | initiates_job | 0.189812478 |
| 17 | 01_551 | 0.174475957 |
| 18 | 551_00 | 0.174475957 |
| 19 | machine_sleep | 0.174475957 |
| 20 | administration | 0.174475957 |
| 21 | functions | 0.174475957 |
| 22 | administration_functions | 0.174475957 |
| 23 | 551 | 0.172137945 |
| 24 | 1 | 0.169462139 |
| 25 | standby | 0.167383334 |

FIG. 10

| 26 | ready_standby | 0.167383334 |
|---|---|---|
| 27 | sleep | 0.160344796 |
| 28 | services | 0.160003409 |
| 29 | tray | 0.135792748 |
| 30 | 00_machine | 0.12826846 |
| 31 | add | 0.117938906 |
| 32 | installed | 0.113615889 |
| 33 | cartridge | 0.112431374 |
| 34 | paper | 0.104010782 |
| 35 | required_add | 0.098684394 |
| 36 | add_paper | 0.094247567 |
| 37 | toner | 0.088340976 |
| 38 | continue | 0.088005711 |
| 39 | saver | 0.087961456 |
| 40 | power_saver | 0.081037294 |
| 41 | paper_tray | 0.080855312 |
| 42 | print_copy | 0.063842918 |
| 43 | copy_services | 0.063842918 |
| 44 | 00_tray | 0.062730538 |
| 45 | services_continue | 0.055642193 |
| 46 | toner_cartridge | 0.055173445 |
| 47 | 7 | 0.0550173 |
| 48 | machine_services | 0.050821024 |
| 49 | correct | 0.050666329 |
| 50 | correct_paper | 0.050666329 |

FIG. 10
CONTINUED

DIAGNOSTIC METHOD AND SYSTEM UTILIZING HISTORICAL EVENT LOGGING DATA

BACKGROUND

This disclosure and the exemplary embodiment described herein relates to diagnostic method and system utilizing historical event logging data generated from one or more devices. Specifically, the exemplary embodiment described herein relates to the processing and classification of historical event logs generated by one or more image processing devices. More specifically, many aspects of the diagnostic method and system described herein are described in a MFD (Multi-Function Device) networked environment, however it is to be understood the processing of historical event logs using an event classifier as disclosed herein can be used with any device or process, etc. which generates an event log.

A MFD (Multi-Function Device) is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFP may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

Diagnostic techniques are generally employed to fix problems in more complex MFDs, and to identify the cause of failure in a machine component from a failure symptom, as well as to predict the occurrence of a particular failure type from pre-failure data. The problems that can be encountered with a fleet of MFDs before an MFD product is launched are often easily observable, repeatable, and diagnosable by an engineering team. Such problems can be repaired utilizing built-in diagnosis tools such as, for example, fault codes, electronic documents, and knowledge base documentation provided in association with the MFDs.

Problems with indirect causes are more difficult to diagnose and repair; however, knowledge of such problems can be gained by a CSE (Customer Service Engineer) who exchanges information anecdotally, or through e-mail, forums, or other general purpose modes of communication. Furthermore, different types of problems may occur in different operating conditions or phases associated with each MFD in an MFD fleet.

Quality in product development is something traditionally achieved through testing and usage of a product during development. There is a cost in achieving product quality, and there is cost in not resolving defects, both in brand and in usage/adoption. However, even after investing significant amounts of money toward achieving software quality prior to product release, it is rare that a software product remains defect-free when released. Usually further definition of a problem is necessary to help bring clarity to a problem definition and ultimate resolution.

Internal Failures refer to a defect found during the development of a software product. There is a cost associated with the ongoing tracking of these defects. This includes the cost to rework (fix) defects, the side effects of fixing a defect including mitigation, and finally the cost in tracking and recording defects as organizations asses and evaluate said defects.

External Failures refer to a defect found after the release of a product and most likely during the use of a software product. External Failures found through help line support, complaint resolution, product return/replacement, or labor associated with repair for warranties are the traditional modalities of defect identification. Remote diagnostic systems are used in more recent times to collect data that pertains to possible defects.

In addition, there is a need to distinguish a defect from a tolerable error that the system expects. For example, for a system that has a client that communicates to a server on the internet, there is always the possibility of a communication error between the client and server. The system may be released with such a defect and this might be perfectly acceptable. This highlights an additional element of the problem space: a diagnostic system needs to distinguish between a tolerable error and a potential defect of the system.

Failures of systems that arise externally are generally more costly than those found in earlier phases of the development life cycle of a system. Part of this cost relates to the difficulty in tracking down and recreating external defects. Some of these difficulties are a result of lacking a defined process, failure to follow a defined process, and incomplete data that surrounds reporting such a failure. In contrast, prior to release of a product, quality engineers follow a defined process to capture logs, steps that led up to the problem, configuration and other pertinent data that allows development teams to resolve internal defects as rapidly as possible.

After releasing software, it is often difficult to capture log data and relevant procedural and configuration information from the user or system at the time of failure. Investigating a problem that has only been vaguely identified can be time consuming and costly and requires manual filtering large amounts of variable data by a subject matter experts. Furthermore, the time it takes to find the key feature set of a given error is compounded by red herrings, or errors that appear to be key features when in fact they are not. These factors expose a need for a better mechanism to identify problems in a proactive fashion—particularly within a Device Management Application (DMA) environment where there are multiple components working together as system.

INCORPORATION BY REFERENCE

Boehm, B., and V. Basili, "Software Defect Reduction Top 10 List," IEEE Computer, vol. 34, no. 1, January 2001, pp. 135-137;

U.S. Pat. No. 8,965,949, Issued Feb. 24, 2015, by "Tracy E. Thieret, and entitled "SYSTEM AND METHOD FOR APPLYING COMPUTATIONAL KNOWLEDGE TO DEVICE DATA";

U.S. Pat. No. 8,264,702, Issued Sep. 11, 2012, by St. Jacques, Jr. et al., and entitled "METHOD AND SYSTEM FOR DETERMINING ROOT CAUSE OF PROBLEMS IN MEMBERS OF A FLEET OF MULTI-FUNCTION DEVICES";

U.S. Pat. No. 8,145,073, Issued Mar. 27, 2012, by Bouchard et al., and entitled "SYSTEM AND METHOD FOR IMPROVING FAILURE DETECTION USING COLLECTIVE INTELLIGENCE WITH END-USER FEEDBACK";

U.S. Pat. No. 8,650,187, Issued Feb. 11, 2014, by Chen et al., and entitled "SYSTEMS AND METHODS FOR LINKED EVENT DETECTION"; and U.S. Patent Publication No. 2008/0246987, Published Oct. 9, 2008, by Scrafford et al., and entitled "METHODS AND SYSTEMS FOR SOFT FAILURE DETECTION FOR NETWORKED PRINTERS", are incorporated herein by reference in their entirety.

BRIEF DESCRIPTION

In one embodiment of this disclosure, described is a computer-implemented method of processing a historical event log generated by an image processing device, the historical event log including a historical record of each occurrence of a plurality of events associated with the image processing device and the historical record including event data associated with each event, the method comprising: a) an event log acquisition module acquiring all or part of the historical event log generated by the image processing device, b) accessing an event classifier module to generate a label for each event included in the acquired historical event log with one of a plurality of predetermined labels, the event classifier trained with a plurality of other historical event logs including manually labeled event data associated with an occurrence of a plurality of events recorded by one or more of the image processing device and other image processing devices; and c) a diagnostic module generating a labeled version of the historical event log, the labeled version of the historical event log including the historical record of each occurrence of the events associated with the image processing device and a respective label generated by the event classifier module for each occurrence of the events associated with the imaging processing device.

In another embodiment of this disclosure, described is a diagnostic system for processing a historical event log generated by an image processing device, the historical event log including a historical record of each occurrence of a plurality of events associated with the image processing device and the historical record including event data associated with each event, the diagnostic system comprising: an event log acquisition module configured to acquire all or part of the historical event log generated by the image processing device; an event classifier module configured to generate a label for each event included in the acquired historical event log with one of a plurality of predetermined labels, the event classifier module trained with a plurality of other historical event logs including manually labeled event data associated with an occurrence of a plurality of events recorded by one or more of the image processing device and other image processes; a diagnostic module configured to generate a labeled version of the historical event log, the labeled version of the historical event log including the historical record of each occurrence of the events associated with the image processing device and a respective label generated by the event classifier module for each occurrence of the events associated with the image processing device.

In still another embodiment of this disclosure, described is a diagnostic system for processing a plurality of historical event logs generated by a plurality of networked image processing devices, each historical event log including a historical record of each occurrence of a plurality of events associated with a respective image processing device and the historical record including event data associated with each event, the diagnostic system comprising: an event log acquisition module configured to acquire all or part of the plurality of historical event logs generated by the plurality of networked image processing devices; an event classifier module configured to generate a label for each event included in the plurality of historical event logs with one of a plurality of predetermined labels, the event classifier module trained with a plurality of other historical event logs including manually labeled event data associated with an occurrence of a plurality of events recorded by one or more of the plurality of image processing devices and other image processing devices; and a diagnostic module configured to generate a labeled version of each of the plurality of historical event logs including the historical record of each occurrence of the events associated with the respective image processing device and a respective label generated by the event classifier module for each occurrence of the events associated with the respective image processing device.

BRIEF DESCRIPTION OF THE DRAWINGS

FIG. 7 is an example of a log file including a SOAP message based on wsd1 and xsd.

FIG. 8 is an example of a CSV output historical event log processed to include event labels according to an exemplary embodiment of this disclosure.

FIG. 9 is an example of a portion of a Windows Event Log File associated with a software failure.

FIG. 10 is an example of a list of words associated with a top 50 information gain values used for training an event classifier module according to an exemplary embodiment of this disclosure.

DETAILED DESCRIPTION

Figure 1:
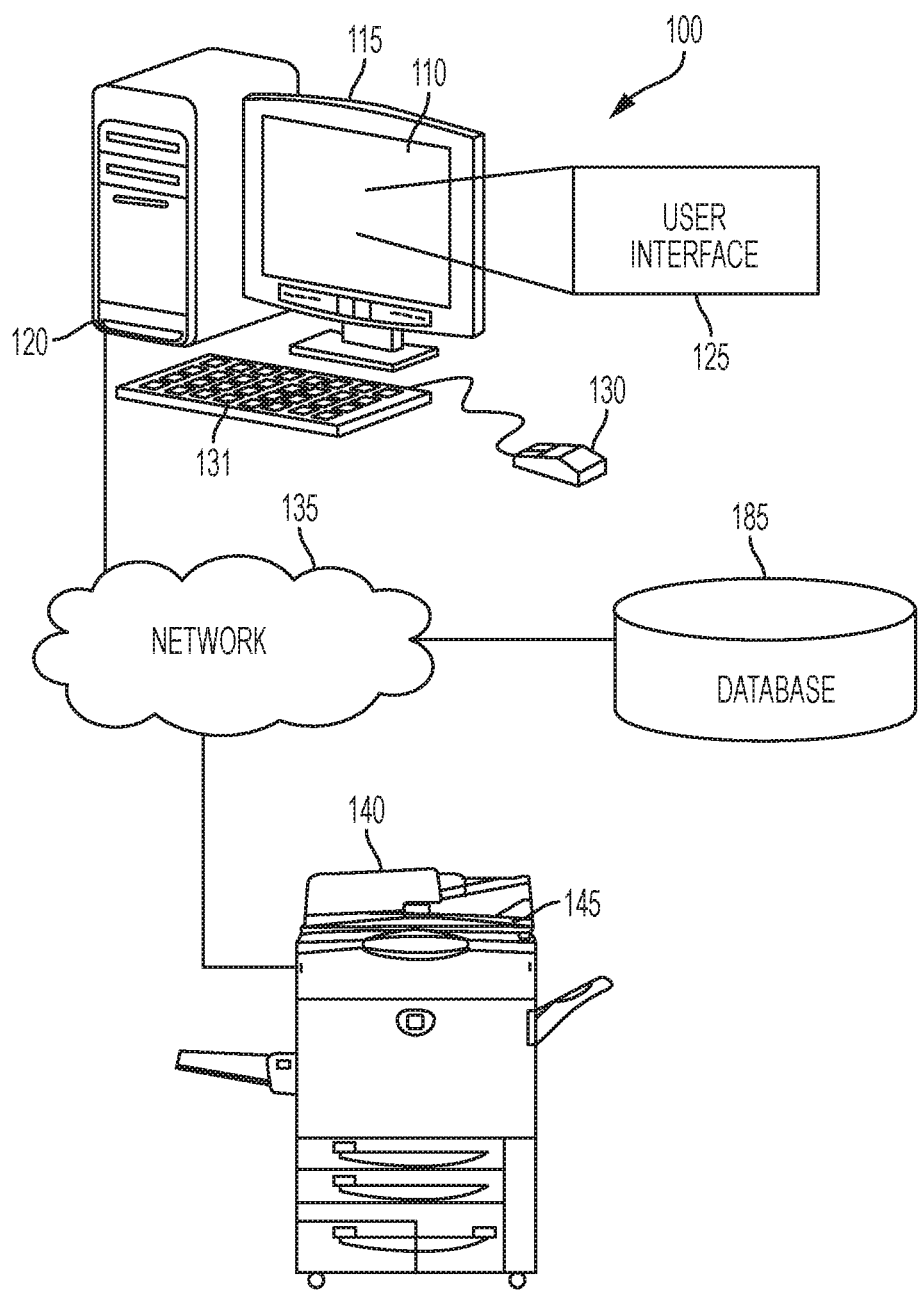
FIG. 1 is a diagram of a diagnostic system for processing a historical event log according to an exemplary embodiment of this disclosure.

In computing, individual log files are used to persist historical records of software. This record includes data that helps in understanding the algorithmic operation of software—such as software-controlled hardware functions, operating systems, applications and other software components. Logs are used to record normal software usage and more uncommon exception states. Since software is designed to run cyclically, patterns within the software emerge over periods of time, are recorded in the log record, retrieved, and used to diagnose problems by experts familiar with the inner workings of the software. In the proactive diagnostic system, the desire is to provide more meaningful insight into the logging systems of printers, printer subsystems, applications, device management agents and device management agent sub-systems. Each of these components records data relevant to identifying both normal operations and exceptions so that problems can be investigated and the mystery of an abnormal behavior resolved. This is similar to how evidence is collected, interpreted and a conclusion drawn during a crime scene investigation.

This disclosure provides a method and system that diagnoses the symptoms of system failure by automatically generating a learned model from historical logging data or simulated data associated with a device such as an image processing device, including but not limited to a printer, scanner, multifunction device, and/or device management application, and by deploying the learned model during the development cycles or in the field. The learned model is trained and tested using supervised machine learning techniques. The historical data includes captured logs device, configuration and other pertinent data in earlier phases of the device/system development. Because it is often challenging and time consuming to extract relevant features of the system failure from pertinent logging data that are both lengthy and noisy, such noisy data is cleaned and parsed into a common data format for all networked devices.

After the data is cleaned, the next step in supervised learning is to extract features that are predictive of failures and diagnostics of the system. Two classes of features are extracted from logging data context: collocational features and bag-of-words features. The collocational features encode information about specific positions to the right or left of the target word. Rule based pattern extraction techniques are used to extract such features. To test the generated model, an unordered set of words (the bag-of-words) is selected with their frequencies using information gain thresholds. The set of frequently used content words and the set of collocational features are used to construct feature vectors. Given training data that was previously labeled by subject matter experts (SME) together with the extracted features, several supervised learning techniques are used to train a failure detection classifier, for example, but not limited to, the Maximum Entropy method, the Naïve Bayes method and the Decision Tree method. The accuracy of the classifier is tested using unseen data. After the accuracy of the learned classifier is validated, the classifier can be deployed to a system to diagnose failures in a development environment or in the field.

The generated pre-classified sets of problems reduce the time spent required for investigating known bugs or problems, thereby allowing engineers or support personnel to focus on unclassified problems. This in turn enables the system to automatically and efficiently resolve classified problems.

With reference to FIG. 1, illustrated is a diagram of a diagnostic system for processing a historical event log according to an exemplary embodiment of this disclosure. The diagnostic system 100 includes a MFD 140, operatively associated with a data processing device 110. The MFD 140 and data processing device 110 communicate over a network 135 which also provides communication with a database 185. The MFD 140 includes an operatively associated user interface and the data processing device 110 is operatively associated with a display device 115, keyboard 131, mouse 130, and user interface 125. A central processing unit and/or server 120 is operatively connected to the network and is configured to execute computer instructions to provide a computer-implemented method of processing a historical event log generated by an image processing device, such as MFD 140. Database 185 is configured to provide the ability to store historical event logs generated by MFD 140 or other image processing devices operatively connected to the data communication network 135.

Figure 2:
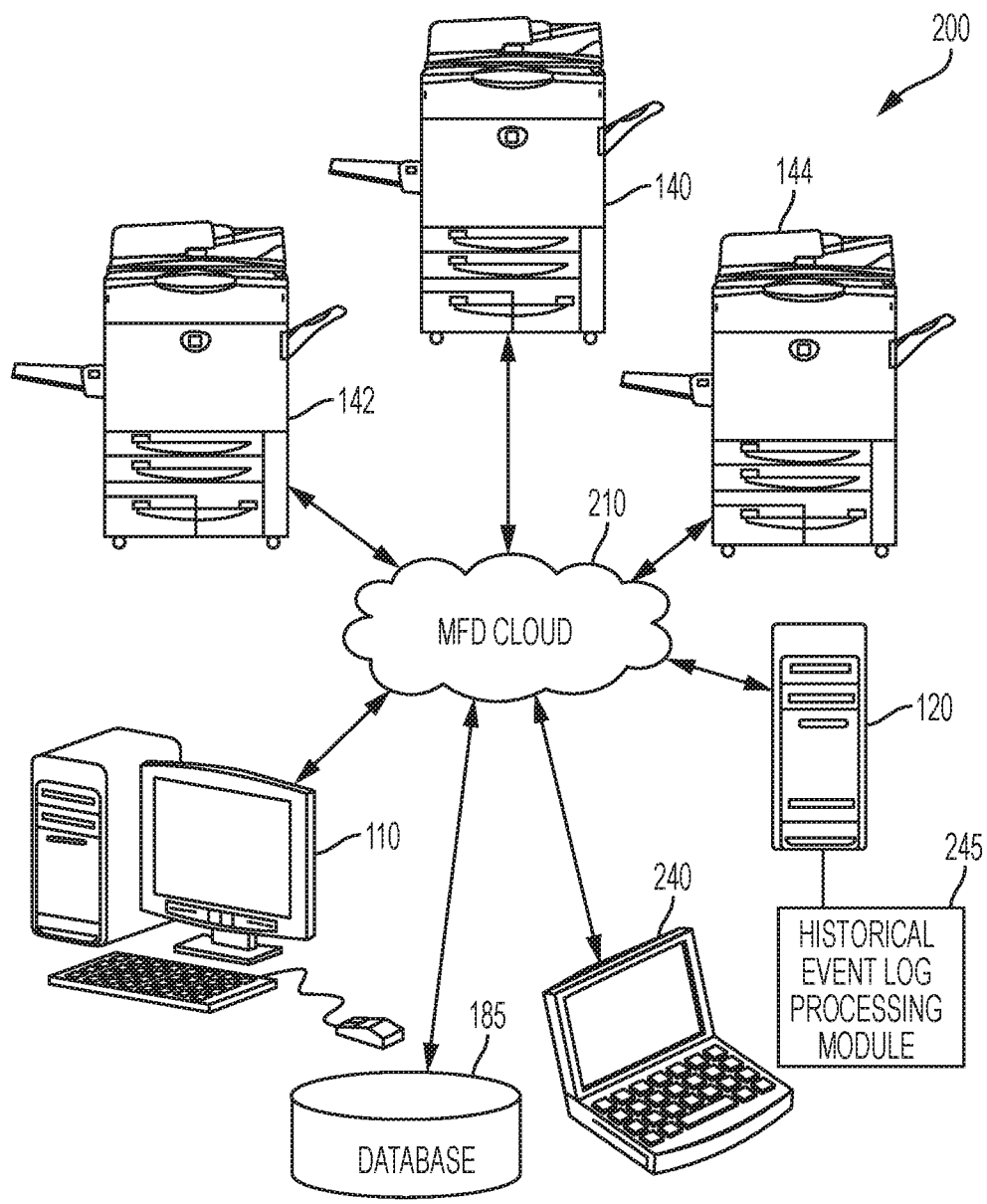
FIG. 2 is a diagram of a diagnostic system for processing a plurality of historical event logs associated with a plurality of networked image processing devices according to an exemplary embodiment of this disclosure.

With reference to FIG. 2, illustrated is a diagram of another diagnostic system for processing a plurality of historical event logs associated with a plurality of networked image processing devices according to an exemplary embodiment of this disclosure. The diagnostic system 200 includes MFD 140, MFD 142, MFD 144, data processing device 110, and central server 120 operatively connected over an MFD cloud 210 network. In addition, database 185 and a user laptop 240 are operatively connected to the MFD cloud 210 network. A historical event log processing module 245 operatively connected to central server 120 executes a method of processing a historical event log generated by one or more of MFDs 140, 142 and 144.

Figure 3:
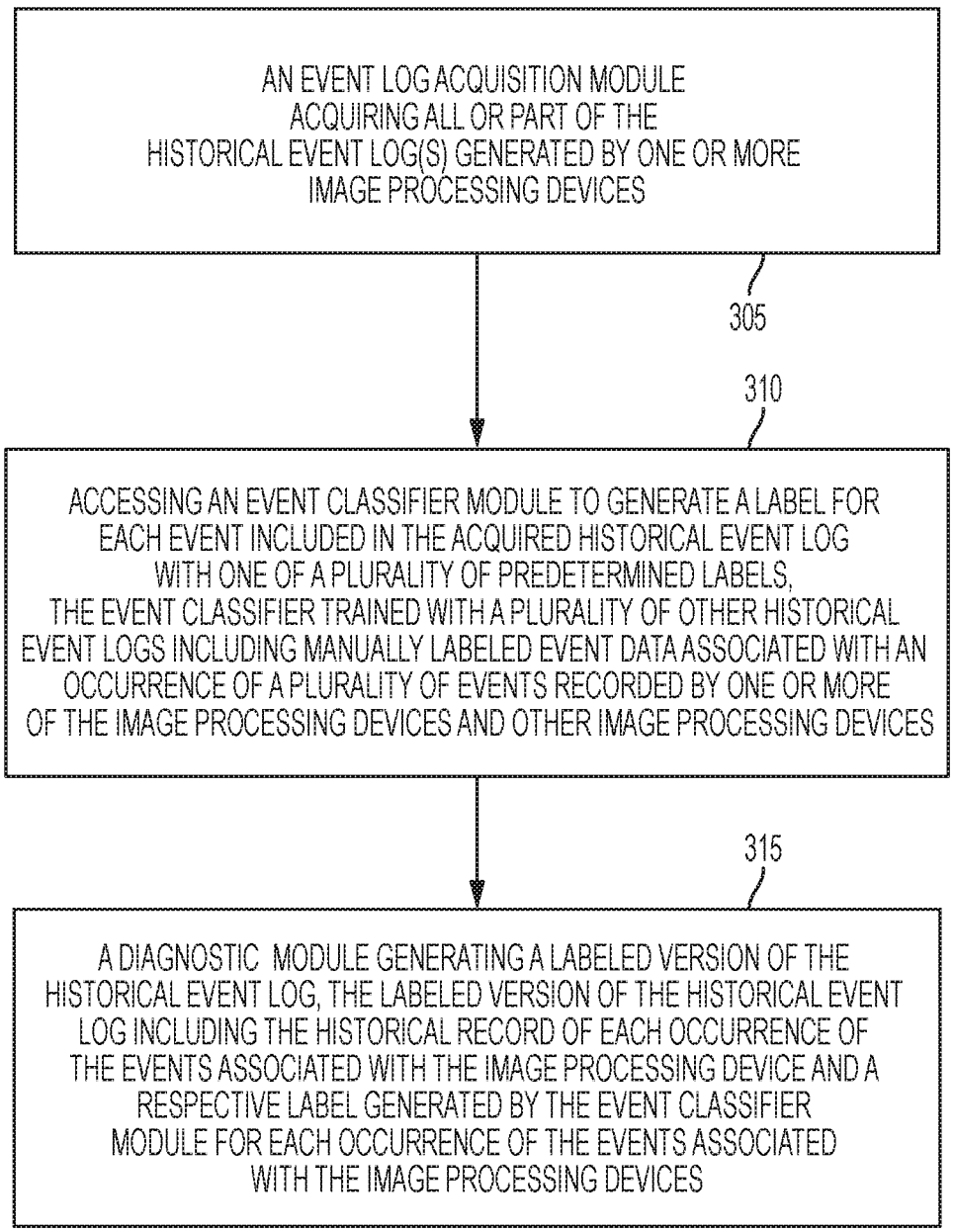
FIG. 3 is a flow chart of a method of processing a historical event log according to an exemplary embodiment of this disclosure.

With reference to FIG. 3, illustrated is a flow chart of a method of processing a historical event log according to an exemplary embodiment of this disclosure. The method can be performed by one or more of the data processing device 110, central server 120 and/or laptop previously described.

Initially, at step 305, an event log acquisition module acquires all or part of the historical event log(s) generated by one or more image processing devices, such as MFDs 140, 142 and 144.

Next, at step 310, an event classifier is accessed to generate a label for each event included in the acquired historical event logs with one of a plurality of predetermined labels, the event classifier trained with a plurality of other historical event logs including manually labeled event data associated with an occurrence of a plurality of events recorded by one or more of the image processing devices and other image processing devices.

Finally, at step 315, a diagnostic module diagnoses or predicts by utilizing an event classifier generated in step 310 which generates a labeled version of the acquired historical event log including the historical record of each occurrence of the events associated with a respective image processing device and a respective label generated by the event classifier for each occurrence of the events associated with the respective image processing devices.

Figure 4:
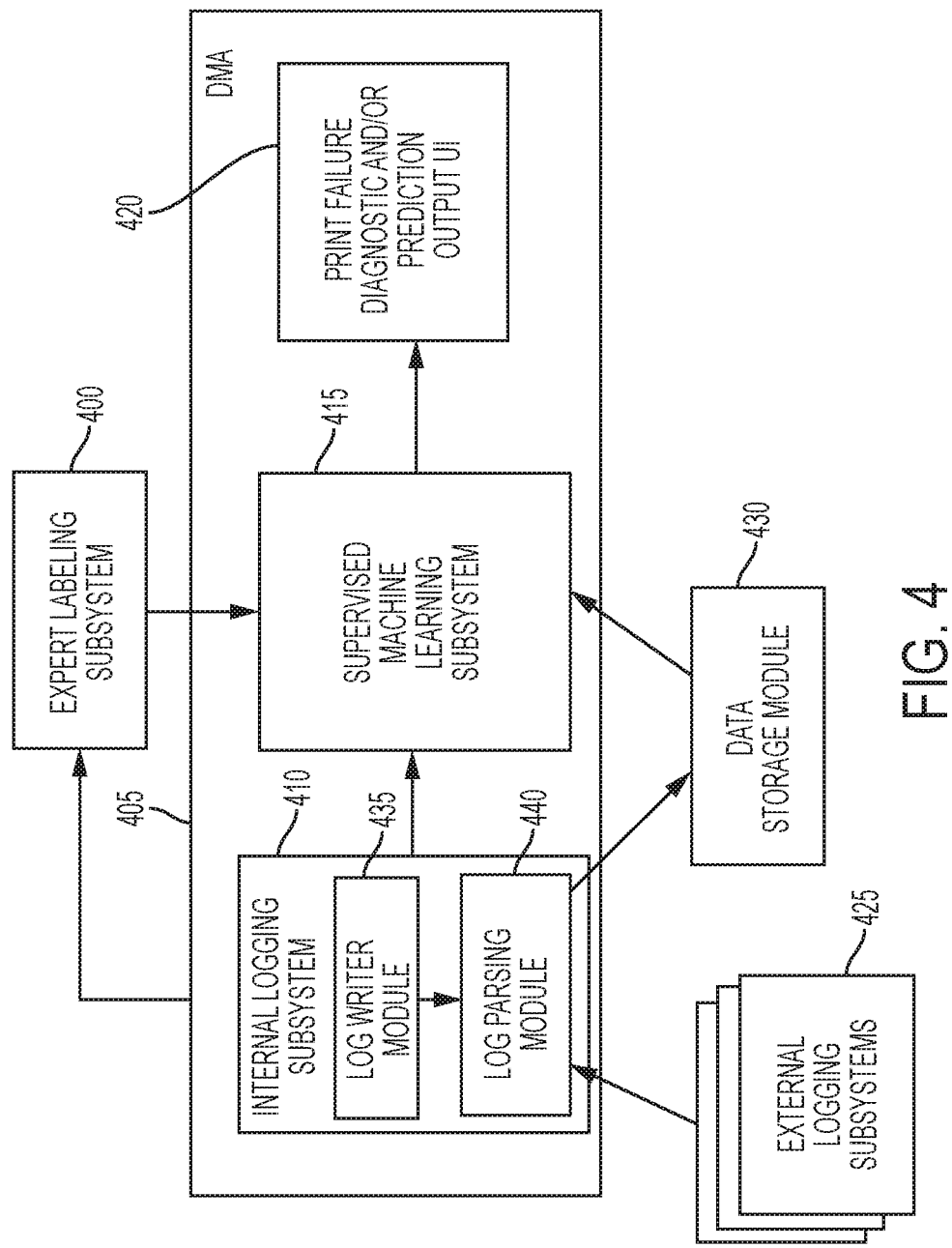
FIG. 4 is a block diagram of a diagnostic system for processing a historical event log according to the exemplary method shown in FIG. 3.

With reference to FIG. 4, illustrated is a block diagram of a diagnostic system for processing a historical event log according to the exemplary method shown in FIG. 3. The diagnostic system including a DMA (Device Management Application) 405 operatively associated with an expert labeling subsystem 400, an external logging subsystem 425 and a data storage module 430. The DMA 405 further includes an internal logging subsystem 410, and a supervised machine learning subsystem 415 operatively associated with a print failure diagnostic and/or prediction output UI (user interface) 420. The internal logging subsystem 410 further includes a log writer module 435 and a log parsing module 440. 1) The system collects historical logging data via internal logging subsystem 410 or external logging subsystems 425. Such collected logging data is filtered and transformed as a common data format using log writer module 435 and log parsing module 440. 2) The output of 410 can be stored in data storage module such database 430, or can be directly feed into supervised machine learning subsystem 415. 3) The part of such data is labeled by subject matter experts in expert labeling subsystem 400. This labeled data is used to train and test event classifier. The output of subsystem 400 can be also stored in data storage module 430. 4) Supervised machine learning subsystem 415 generates a event classifier described in 41 using the output of 400, 410 and/or 430. Such event classifier is used to diagnose or predict unseen events using the output from 410 and/or 430 as described in diagnostic module described in 42. 5) Print failure diagnostic and/or prediction output UI 420 interacts with user to inform the diagnosis of the problem by applying the model or classifier generated in 415.

Figure 5:
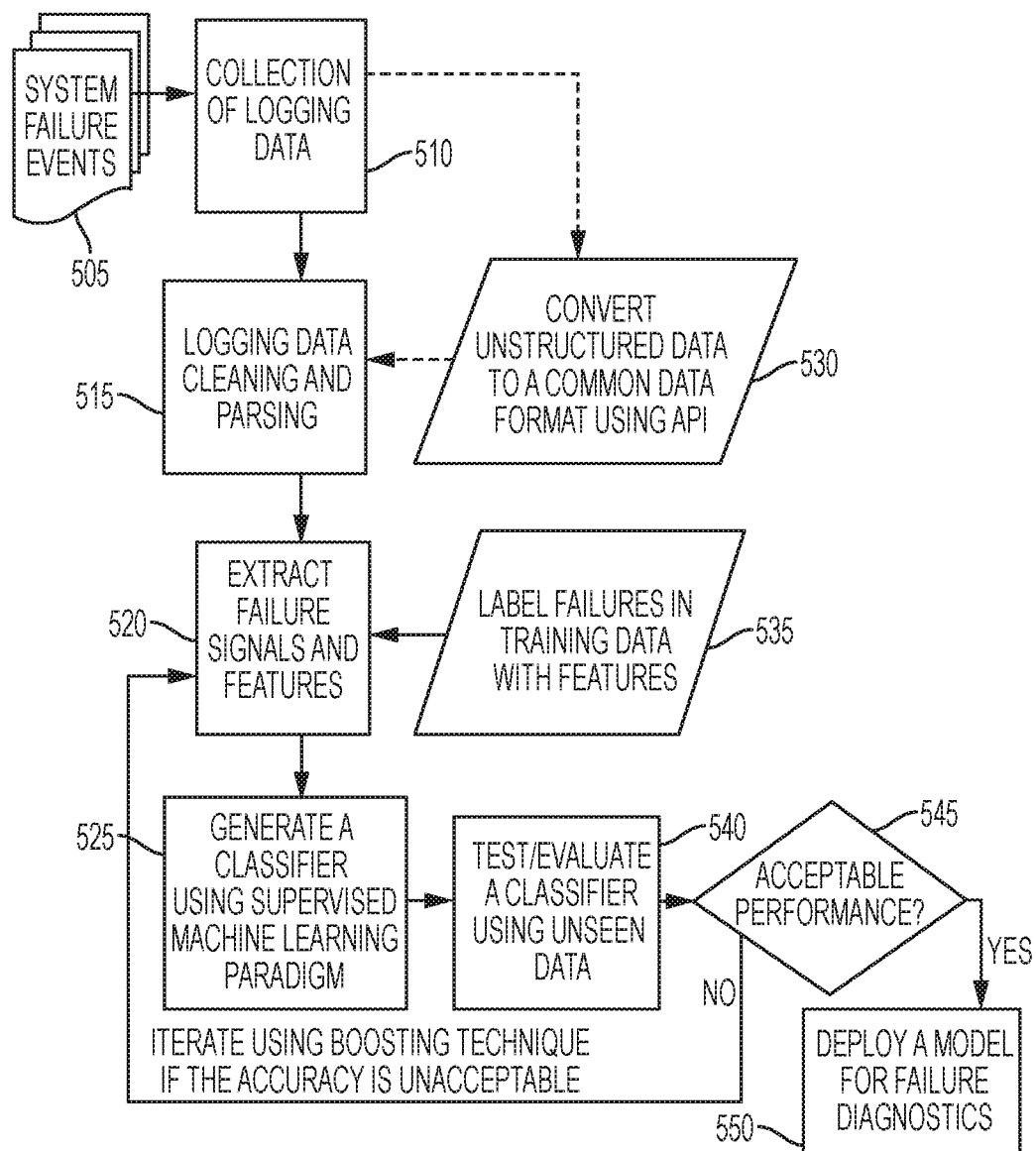
FIG. 5 is a flow chart of a method of training an event classifier module according to an exemplary embodiment of this disclosure.

With reference to FIG. 5, illustrated is a flow chart of a method of training an event classifier module according to an exemplary embodiment of this disclosure.

1) Acquiring pertinent logging data from system 510;
2) Cleaning and/or parsing the logging data 515 (Interface to conform to the common format) 530;
3) Labelling data by subject matter experts from historical or simulated data 535;
4) Extracting features using pattern extraction method or/and bag-of-words with information gain 520;
5) Training the classifier for diagnostics of failures with the extracted features using supervised machine learning paradigm 525;
6) Testing the classifier using unseen data 540;
7) Improving the accuracy using boosting technique and iterate step 4 to step 7 until the accuracy reaches the required level 545; and
8) Deploying the model in DMA to predict and diagnose failures in the field using the learned model 550.

1) Acquiring Pertinent Logging Data 510.

Figure 6:
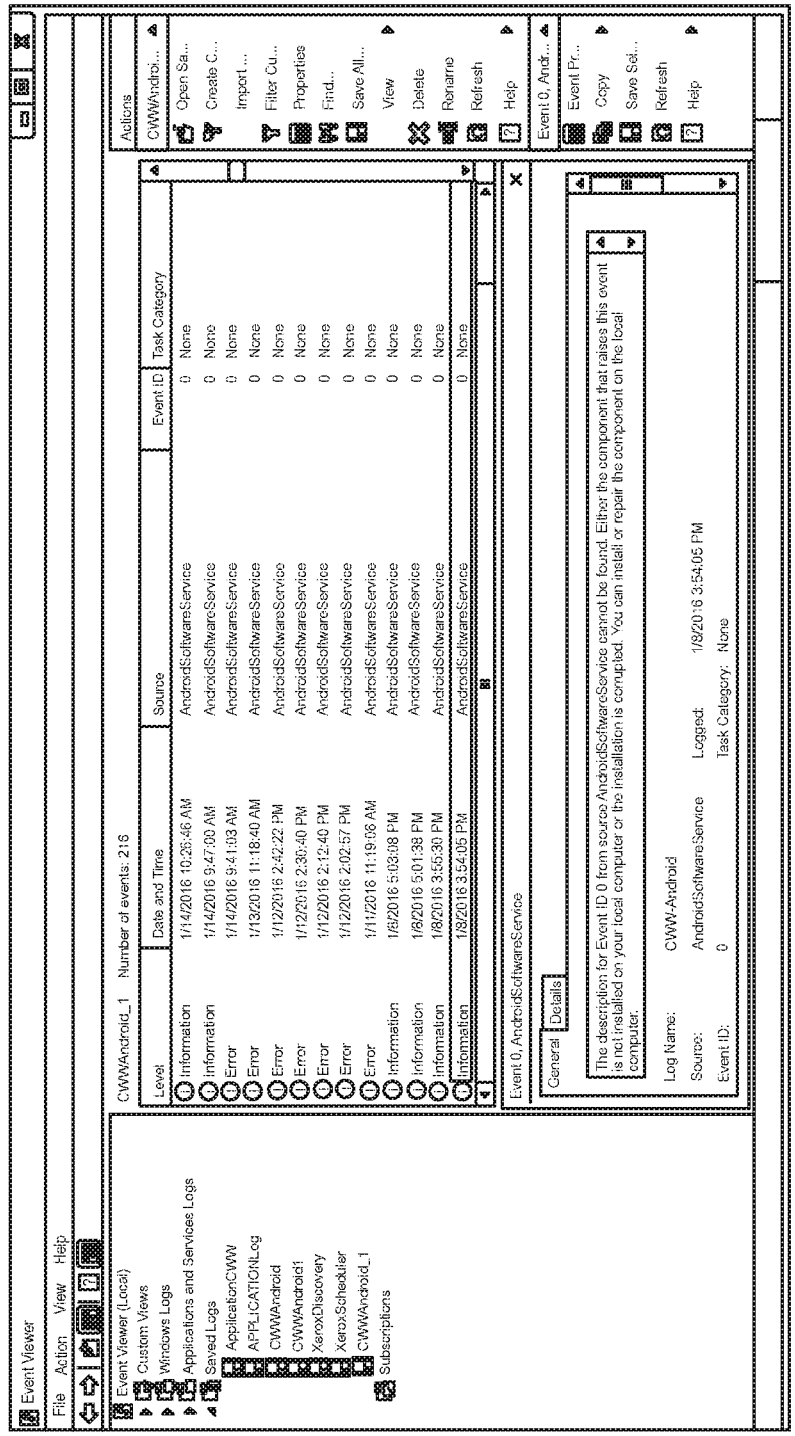
FIG. 6 is an example of a Windows Event Log from a service used to update an android device.

Many expected failures of the system including hardware and software are designed to be captured in various logging files in a server machine and/or devices. When the failure happens, engineers go through these logging files to trace down the source of failures. Quality engineers and developers who are familiar with failures or symptoms know which part of files to look at to pin down the source of problems. FIG. 6 shows the screenshot of an example log file (Windows Event Log) from a service used to update an Android Device using Centre Ware Web (CWW) application. Details of the error log contain the information about system failures or software failures in an order of events. For some cases, the code that writes this event log is written by software engineers for the purpose to trace the possible failure cases. This could be modified to continue to write the event log, but also extended to call the web service such as LogSingleEntryRequest shown in FIG. 11 and FIG. 13.

Another example of log file that contains SOAP message based on wsdl and xsd is shown in FIG. 7. A wsdl and xsd has been defined to provide an example of one possible interface definition. The wsdl provides an interoperable interface whereby clients can send SOAP messages. This is a flexible interface whereby one can configure the hosting environment to allow both TCP/IP binding or HTTP/HTTP(s) bindings.

2) Data Cleaning and Parsing 515.

Shown in FIG. 8, Table 1 is an example of what the csv output would look like after cleaning and parsing of raw print alert history data has been done. In the below case, print alert descriptions have been filtered out, and severity level and the category of subunit in the printer have been assigned to each problem. In these examples, we chose to use csv as output format but any common file format such as xml or plain text file can be used.

3) Label Logging Data by Subject Matter Experts from Historical or Simulated Data 535.

After the data has been cleaned, a subject matter expert labeled each row of logged data based on description extracted, severity levels and training level required to solve the problem. In this example, we labeled problems in two classes; error state and no error state. However, this can be labeled as multiple classes such as error, warning, or okay state, or critical, major, ordinary. The first column in the table shown in FIG. 8 indicates the label of each row.

4) Extract Features Vectors for Classification 520.

After the data is cleaned, the next step in the training stage in supervised learning is to extract features that are predictive of failures and diagnostics of the system. Two types of features are extracted from logging data context: collocational features and bag-of-words features. The collocational features encode information about specific positions to the right or left of the target word. In an exemplary embodiment described herein, rule based pattern extraction techniques are used to extract such features. As shown in FIG. 9, an example of a windows event log file contains a set of features that could direct the diagnostics of failures at the beginning of the file. For example, pattern words can be filtered such as the file path, file name and function name in line 32 of the windows event log to trace the source code for debugging. The exception type in line 22, event message in line 2, event time in line 3 and application path in line 12 of the windows event log can be also extracted for training of an event classifier. Pattern extraction is used to apply the disclosed method to automatically extract key information from an event log for the diagnosis of failures of a device in proactive diagnostic system.

An unordered set of words (bag-of-words) is selected with their associated frequencies using an information gain value. That list of words with the top 50 information gain values that was used for training of an event classifier is shown in FIG. 10, which includes Table 2, the top 2000 words that are ranked by the information gain are kept as feature vector for the construction of the classifier.

5) Train the Classifier Using Supervised Machine Learning Technique 525.

Given training data that was labeled by subject matter experts together with the extracted feature vector described in the previous section, several supervised learning techniques are used to train a failure detection classifier, for example Maximum Entropy, Naïve Bayes and a Decision Tree method. The classification module processes text files (text mining module) built in Java. A total of 4045 data entries which were labeled were used for training the classifier and only a small portion of the data is partly displayed in the table shown in FIG. 8. 80% of the labeled data (3316 entries) was used for the training and 20% of the labeled data (829 entries) was used for testing. A five-fold cross validation method was used to sample training and testing data, and to evaluate the performance of the classifier. The result of the classifier performance using three techniques is shown in Table 3 below. Both the accuracy and F-measure metrics are used to validate the performance of the classifier.

TABLE 3

| Supervised Learning Technique | Mean Train Accuracy | Mean Test Accuracy | Mean Train F-measure | Mean Test F-measure |
| --- | --- | --- | --- | --- |
| Maximum Entropy | 94.8% | 94.8% | 96.2% | 91.4% |
| Naïve Bayes | 96.2% | 95.9% | 96.9% | 93.5% |
| Decision Tree | 94.0% | 93.8% | 95.8% | 90.1% |

6) Test the Classifier Using Unseen Data 540.

The performance of the classifiers created in step 5 was tested using unseen data (1894 entries) as shown in Table 4 below.

The classifier constructed with Naïve Bayes algorithm seems to work the best for the given example logging file. After the accuracy of the learned classifier is validated, the classifier can be deployed to a system to diagnose failures in a development environment or in the field.

TABLE 4

| Classifier | Model Accuracy |
| --- | --- |
| Maximum Entropy Classifier | 94.1% |
| Naïve Bayes Classifier | 94.6% |
| Decision Tree Classifier | 91.0% |

7) Improve the Accuracy Using Boosting Technique 545.

The performance of the classifier is very dependent on the user's requirements. The accuracy of the classifier can be improved by iterating steps (step 4-step 7) using boosting techniques such as a co-training or a self-training method.

8) Deployment of Proactive Diagnostic System in DMA 550.

Figure 11:
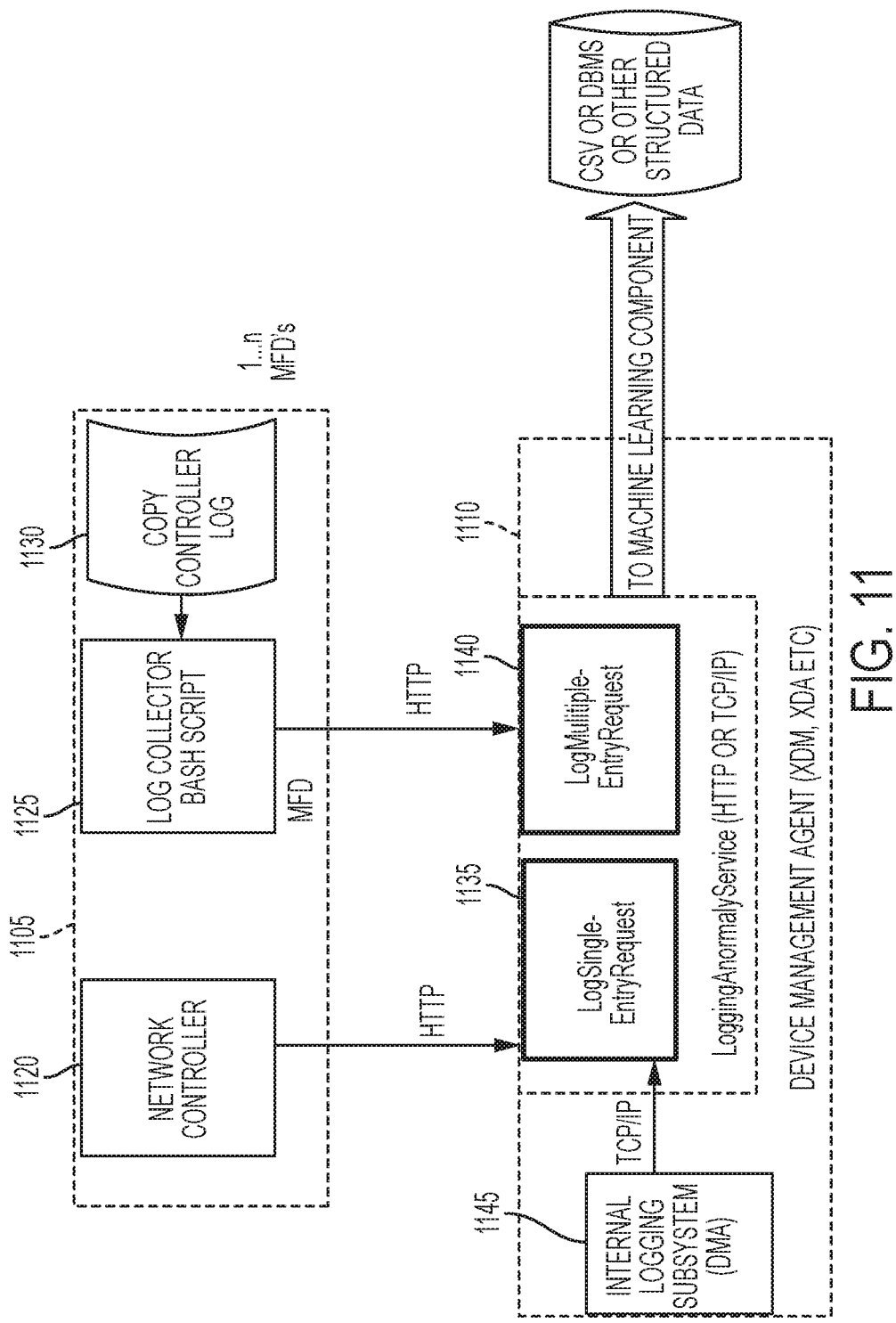
FIG. 11 is a block diagram of a diagnostic system for a plurality of networked MFDs (Multi-Function Devices) including a DMA (Device Management Application) according to an exemplary embodiment of this disclosure.
Figure 12:
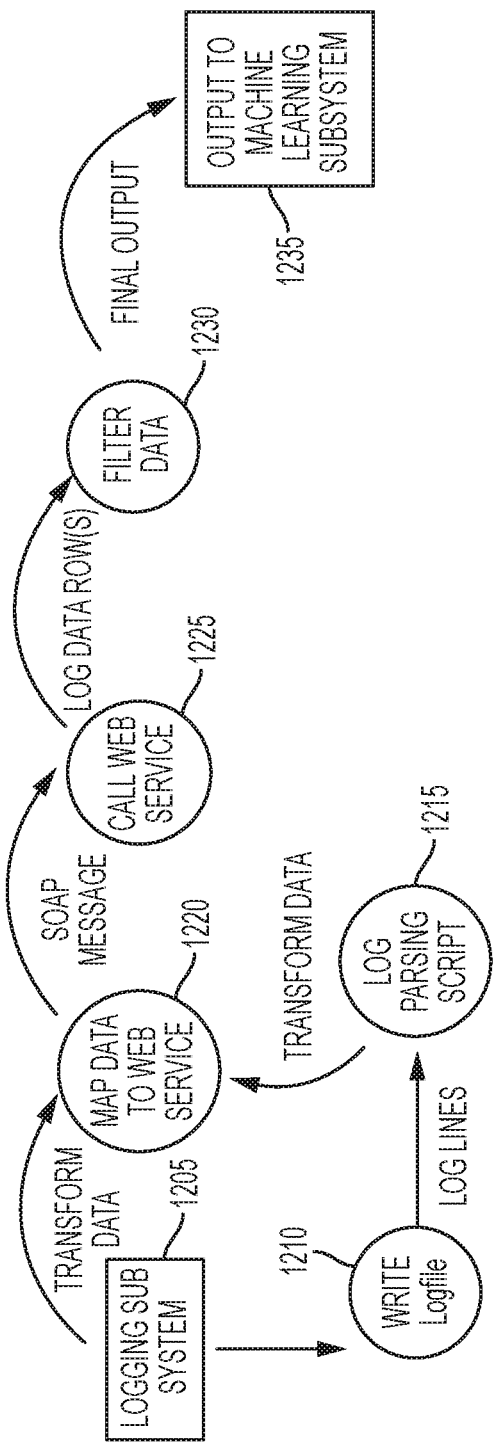
FIG. 12 is a data flow diagram associated with an input and output of the diagnostic system shown in FIG. 11.

FIG. 11 is a block diagram of a diagnostic system for a plurality of networked MFDs (Multi-Function Devices) 1130 including a DMA (Device Management Agent) 1110 according to an exemplary embodiment of this disclosure. FIG. 12 is a data flow diagram associated with an input and output of the diagnostic system shown in FIG. 11. The block diagram shows the environment of a method and system whereby the proactive diagnostic system would be best suited. It includes a Device Management Agent 1110 (DMA such as XDM, XDA etc.) and a multiplicity of Multi-Function Devices (MFD's) 1130. The goal of the deployed model is that when the proactive diagnostic system is deployed it should be as a service. Therefore, any system (DMA or individual MFD) or software sub-systems may use logs to trace checkpoints and errors during runtime. For example on an MFD, various controllers would each have their own log 1125 that sends to the proactive diagnostic system. This service accomplishes three purposes:

The data is conformed to the desired structure necessary for the machine learning algorithms.

It reduces noise by filtering out unnecessary rows based on a set of metadata included in the service call.

It collects log data in one centralized location 1145 (at the DMA 1110)

The Network Controller 1120, Copy Controller 1130 and Internal Logging System 1145 of the DMA are examples of possible consumers of the service.

With reference to FIG. 12, the data flow diagram includes the flow of data from a logging sub system (1205) to a centralized collection point (1235) that follows two potential paths. The first path calls the logging system at runtime each time a key logging event takes place. First it maps its internal logging format to the defined web service (1220). Then it calls the web service by sending a SOAP message request (1225), the data is filtered/cleaned (1230) and finally output to the machine learning subsystem (1235). The second path diverges initially but then follows the same path. It allows for legacy logs that were already written (1210) to be processed in more of a batch fashion using a script or separate executable (1215). This program parses the log and sends through the web service (again through 1225).

Details of Logging Interface

The service itself can run on a DMA and be available for clients to submit log files to at any time. In addition, the service is configurable to allow both SOAP (HTTP, HTTPs, TPC/IP) and REST (HTTP, HTTP) implementations to provide the easiest mechanisms by which clients can implement the interfaces necessary.

Two operations are available as well as an optional assembly library.

LogSingleEntryRequest 1135—allows logging sub-components to submit data during runtime. Logging sub-components can be extended to include a client that submits data to the desired interface each time the log is written to. (FIG. 13)

Figure 13:
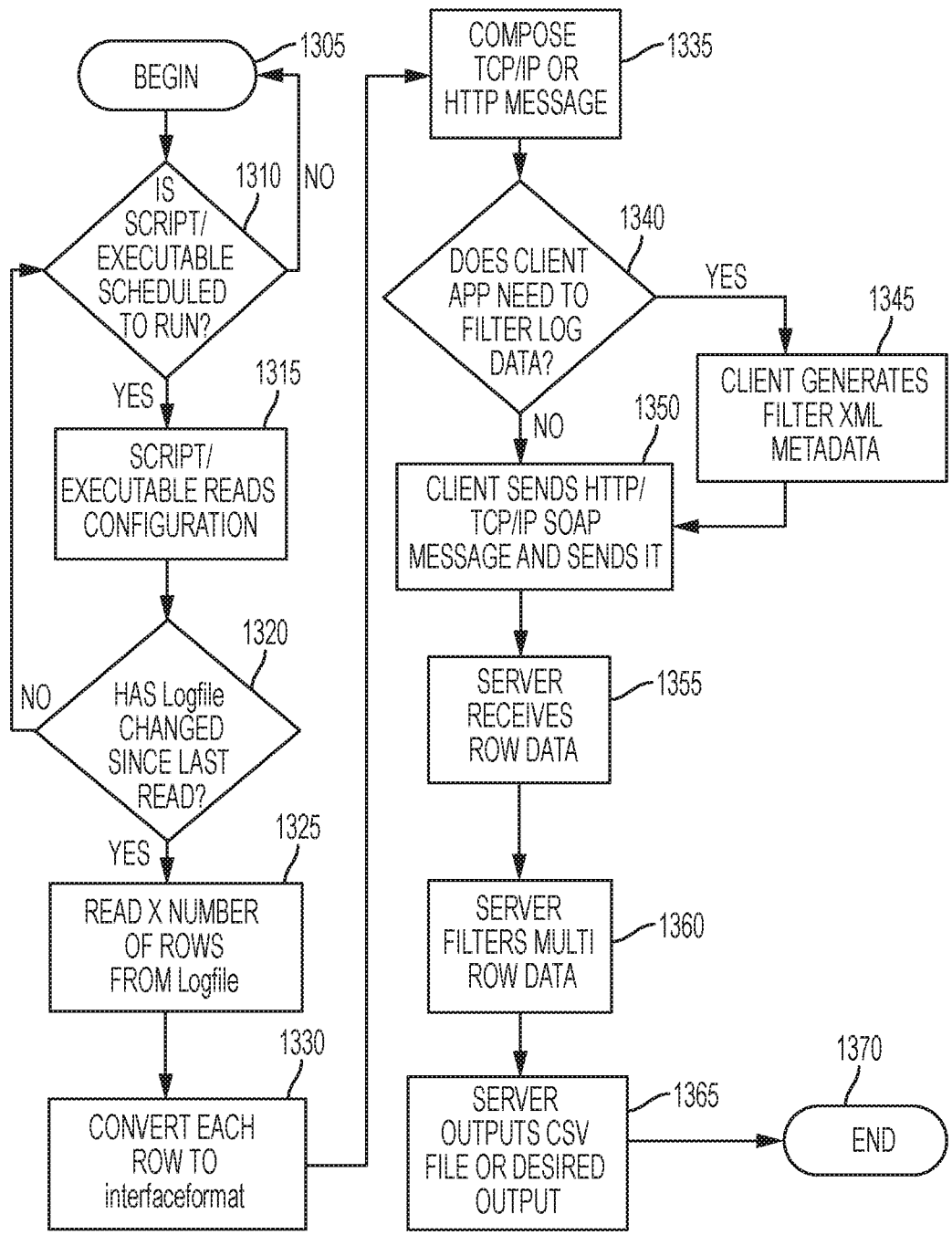
FIG. 13 is a flow chart of a Log/Single/Entry/Request process associated with the diagnostic system shown in FIG. 11.

With reference to FIG. 13, illustrated is a flow chart of a LogSingleEntryRequest process associated with the exemplary diagnostic system shown in FIG. 11. FIG. 13 shows the logic around the legacy logs that are parsed by a script or executable file on a batch basis. First it checks to see if the scheduled time is reached (1310). Once reached, it reads in a configuration file as input (1315) and determines if the logfile has changed since the last time the script ran (1320). It reads all the new log rows in (1325) and transforms the log into the format of the web service (1330). Following this, the request message is composed (1335) along with an optional filter (1340, 1345), and then sends the SOAP message (1350) over the wire to the listening service (1355). Finally, the server filters/cleans (1360) and outputs the data to the desired machine learning subsystem format (1365).

LogMultipleEntryRequest 1140—allows components to submit groups of tuples to the Log Anomaly service at one time. This is useful if a script is implemented that submits. (FIG. 14)

Figure 14:
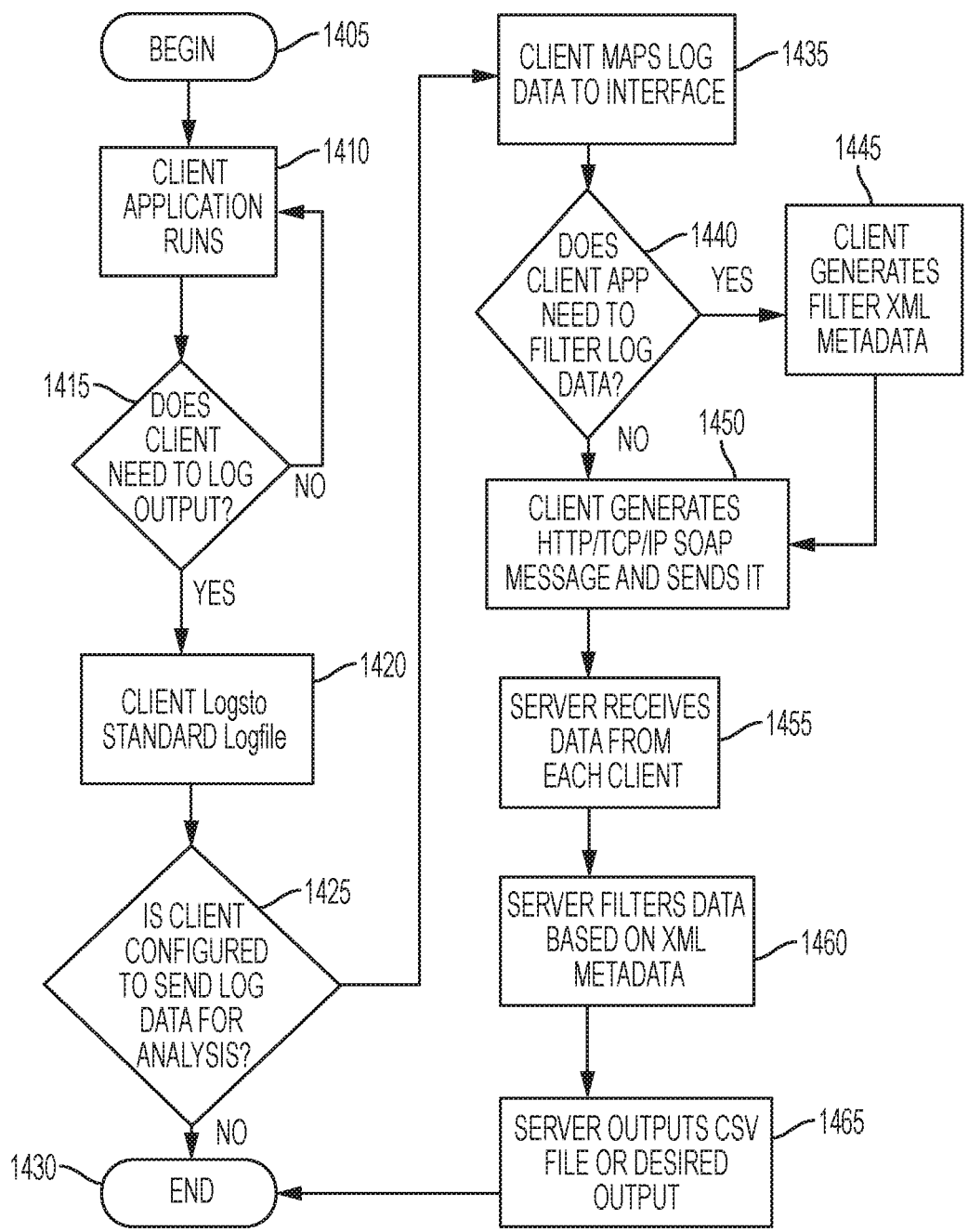
FIG. 14 is a flow chart of a LogMultipleEntryRequest process associated with the diagnostic system shown in FIG. 11.

With reference to FIG. 14, illustrated is a flow chart of a LogMultipleEntryRequest process associated with the exemplary diagnostic system shown in FIG. 11. FIG. 14 shows the logic around the logs that are generated at runtime while simultaneously sending data to the centralized collection point and its machine learning subsystem. First the client application runs (1410) and checks to see if while running a log event happens (1415). It then logs this to its local log file (1420) an addition, if configured (1425), maps the log data to the webservice (1435), optionally filters it (1440, 1445) and sends the centralized system (1450). Finally, the server filters/cleans (in 1460) and outputs the data to the desired machine learning subsystem format (1465).

Log Client—an optional component that encapsulates the filtering and client logic into one assembly, such as a dll or exe as a command line tool. This allows filtering to occur on the client, rather than the server, reducing the performance load on the server.

This disclosure provides a system that diagnoses symptoms of system failures by automatically generating a learned model from historical logging data or simulated data using supervised learning technique.

According to an exemplary embodiment, the learned model is deployed to a diagnostic system to prevent recurring problems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of processing a historical event log generated by an image processing device, the historical event log including a historical record of each occurrence of a plurality of events associated with an execution of one or both of hardware and software associated with the image processing device and the historical record including event data associated with each event, the method comprising:
   a) an event log acquisition module acquiring all or part of the historical event log generated by the image processing device;
   b) accessing an event classifier module to generate a label for each event included in the acquired historical event log with one of a plurality of predetermined labels, the event classifier module trained with a plurality of other historical event logs including manually labeled event data associated with an occurrence of a plurality of events recorded by one or more of the image processing device and other image processing devices and the event classifier module trained by extracting features from the plurality of other historical event logs predictive of failures and diagnostics associated with the one or more of the image processing device and other image processing devices, the extracted features including collocational features and bag-of-words features associated with event data included in the plurality of other historical event logs; and
   c) a diagnostic module generating a labeled version of the historical event log, the labeled version of the historical event log including the historical record of each occurrence of the events associated with the image processing device and a respective label generated by the event classifier module for each occurrence of the events associated with the image processing device,
   wherein the plurality of events are associated with a plurality of image processing device states associated with the image processing device, and the predetermined labels uniquely identify each of the plurality of image device states,
   wherein the plurality of image processing device states are associated with a plurality of image processing device fault states, the fault states and the plurality of predetermined labels including two or more of error, no error, warning, okay state, critical, major, ordinary, and nonclassified, and
   wherein the image processing device is one of a MFD (Multi-Function Device), a printer, a scanner, and a fax machine.

2. The computer-implemented method of processing a historical event log according to claim 1, wherein steps a)-c) are performed as a remotely located web service operatively associated with the image processing device.

3. The computer-implemented method of processing a historical event log according to claim 1, step a) comprising:
   a1) an event log acquisition module acquiring all or part of the historical event log generated by the image processing device; and
   a2) an event log parsing module processing the historical event log to remove events associated with one or more predefined event types.

4. The computer-implemented method of processing a historical event log according to claim 1, wherein the event classifier module module generates feature vectors representative of each event and determines the label for each event based on the feature vector representative of the event.

5. The computer-implemented method of processing a historical event log according to claim 1, wherein the event classifier module is trained using one of a Maximum Entropy method, a Nave Bayes method and a Decision Tree method.

6. The computer-implemented method of processing a historical event log according to claim 1, wherein the image processing device generates a plurality of historical event logs including historical event logs generated by one or more sub-processes executed by the image processing device.

7. The computer-implemented method of processing a historical event log according to claim 1, wherein a DMA (Device Management Application) operatively associated with the image processing device communicates with a remote web server application to initiate the execution of steps a)-c) by the remote web server.

8. A diagnostic system for processing a historical event log generated by an image processing device, the historical event log including a historical record of each occurrence of a plurality of events associated with an execution of one or both of hardware and software associated with the image processing device and the historical record including event data associated with each event, the diagnostic system comprising:
   an event log acquisition module configured to acquire all or part of the historical event log generated by the image processing device;
   an event classifier module configured to generate a label for each event included in the acquired historical event log with one of a plurality of predetermined labels, the event classifier module trained with a plurality of other historical event logs including manually labeled event data associated with an occurrence of a plurality of events recorded by one or more of the image processing device and other image processing device and the event classifier module trained by extracting features from the plurality of other historical event logs predictive of failures and diagnostics associated with the one or more of the image processing device and other image processing devices, the extracted features including collocational features and bag-of-words features associated with event data included in the plurality of other historical event logs; and
   a diagnostic module configured to generate a labeled version of the historical event log, the labeled version of the historical event log including the historical record of each occurrence of the events associated with the image processing device and a respective label generated by the event classifier module for each occurrence of the events associated with the image processing device
   wherein the plurality of events are associated with a plurality of image processing device states associated with the image processing device, and the predetermined labels uniquely identify each of the plurality of image device states,
   wherein the plurality of image processing device states are associated with a plurality of image processing device fault states, the fault states and the plurality of predetermined labels including two or more of error, no error, warning, okay state, critical, major, ordinary, and nonclassified, and
   wherein the image processing device is one of a MFD (Multi-Function Device), a printer, a scanner, and a fax machine.

9. The diagnostic system for processing a historical event log according to claim 8, wherein the event log acquisition module, event classifier module and diagnostic module are remotely located in a web server operatively associated with the image processing device.

10. The diagnostic system for processing a historical event log according to claim 8, comprising:
    an event log parsing module configured to process the historical event log to remove events associated with one or more predefined event types.

11. The diagnostic system for processing a historical event log according to claim 8, wherein the event classifier module is configured to generate feature vectors representative of each event and determine the label for each event based on the feature vector representative of the event.

12. The diagnostic system for processing a historical event log according to claim 8, wherein the event classifier module is trained using one of a Maximum Entropy method, a Naïve Bayes method and a Decision Tree method.

13. The diagnostic system for processing a historical event log according to claim 8, wherein the image processing device generates a plurality of historical event logs including historical event logs generated by one or more sub-processes executed by the image processing device.

14. The diagnostic system for processing a historical event log according to claim 8, further comprising:
    a DMA (Device Management Application) module operatively associated with the image processing device, the DMA configured to communicate with a remote web server application, the remote web server application including the event log acquisition module, the event classifier module and the diagnostic module.

15. A diagnostic system for processing a plurality of historical event logs generated by a plurality of networked image processing devices, each historical event log including a historical record of each occurrence of a plurality of events associated with an execution of one or both of hardware and software associated with a respective image processing device and the historical record including event data associated with each event, the diagnostic system comprising:
    an event log acquisition module configured to acquire all or part of the plurality of historical event logs generated by the plurality of networked image processing devices;
    an event classifier module configured to generate a label for each event included in the plurality of historical event logs with one of a plurality of predetermined labels, the event classifier module trained with a plurality of other historical event logs including manually labeled event data associated with an occurrence of a plurality of events recorded by one or more of the plurality of image processing devices and other image processing devices and the event classifier module trained by extracting features from the plurality of other historical event logs predictive of failures and diagnostics associated with the one or more of the image processing device and other image processing devices, the extracted features including collocational features and bag-of-words features associated with event data included in the plurality of other historical event logs; and a diagnostic module configured to generate a labeled version of each of the plurality of historical event logs including the historical record of each occurrence of the events associated with the respective image processing device and a respective label generated by the event classifier module for each occurrence of the events associated with the respective image processing device, wherein the plurality of events are associated with a plurality of image processing device states associated with the image processing device, and the predetermined labels uniquely identify each of the plurality of image device states, wherein the plurality of image processing device states are associated with a plurality of image processing device fault states, the fault states and the plurality of predetermined labels including two or more of error, no error, warning, okay state, critical, major, ordinary, and nonclassified, and wherein the image processing device is one of a MFD (Multi-Function Device), a printer, a scanner, and a fax machine.

\* \* \* \* \*